(12) United States Patent
Shin et al.

(10) Patent No.: US 11,575,935 B2
(45) Date of Patent: Feb. 7, 2023

(54) VIDEO ENCODING METHOD AND VIDEO DECODING METHOD

(71) Applicants: Electronics and Telecommunications Research Institute, Daejeon (KR); IUCF-HYU (INDUSTRY-UNIVERSITY COOPERATION FOUNDATION HANYANG UNIVERSITY), Seoul (KR)

(72) Inventors: Hong Chang Shin, Daejeon (KR); Gwang Soon Lee, Daejeon (KR); Ho Min Eum, Daejeon (KR); Jun Young Jeong, Seoul (KR); Kug Jin Yun, Daejeon (KR); Jun Young Yun, Namyangju-si (KR); Jong Il Park, Seoul (KR)

(73) Assignees: Electronics and Telecommunications Research Institute, Daejeon (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 66 days.

(21) Appl. No.: 16/902,059

(22) Filed: Jun. 15, 2020

(65) Prior Publication Data
US 2020/0396485 A1 Dec. 17, 2020

(30) Foreign Application Priority Data

Jun. 14, 2019 (KR) .......................... 10-2019-0071116
Jun. 10, 2020 (KR) .......................... 10-2020-0070070

(51) Int. Cl.
*H04B 1/66* (2006.01)
*H04N 7/12* (2006.01)
(Continued)

(52) U.S. Cl.
CPC .................................. *H04N 19/597* (2014.11)

(58) Field of Classification Search
CPC ... H04N 19/597; H04N 19/172; H04N 19/105
See application file for complete search history.

(56) References Cited

U.S. PATENT DOCUMENTS

2012/0122062 A1    5/2012 Yang et al.
2012/0269275 A1*  10/2012 Hannuksela ........... H04N 19/34
                                                              375/E7.026
(Continued)

FOREIGN PATENT DOCUMENTS

KR         101778710 B1     9/2017
KR     1020180005859 A      1/2018

OTHER PUBLICATIONS

Salahieh et al. ("Test Model for Immersive Video", Coding of moving pictures and audio, ISO/IEC JTC 1/SC 9IWG 11, N18470, Mar. 2019, International Organisation for Standardisation, Geneva, CH.) (Year: 2019).*

(Continued)

*Primary Examiner* — Fabio S Lima
(74) *Attorney, Agent, or Firm* — William Park & Associates Ltd.

(57) ABSTRACT

A video encoding method of encoding a multi-view image including one or more basic view images and a plurality of reference view images includes determining a pruning order of the plurality of reference view images, acquiring a plurality of residual reference view images, by pruning the plurality of reference view images based on the one or more basic view images according to the pruning order, encoding (Continued)

the one or more basic view images and the plurality of residual reference view images, and outputting a bitstream including encoding information of the one or more basic view images and the plurality of residual reference view images.

12 Claims, 8 Drawing Sheets

(51) Int. Cl.
  *H04N 11/02* (2006.01)
  *H04N 11/04* (2006.01)
  *H04N 19/597* (2014.01)

(56) References Cited

U.S. PATENT DOCUMENTS

| | | | | |
|---|---|---|---|---|
| 2012/0307007 | A1* | 12/2012 | Kim | H04N 13/128 348/E13.071 |
| 2015/0317057 | A1 | 11/2015 | Choi et al. | |
| 2019/0297258 | A1* | 9/2019 | Trevor | H04N 5/23216 |
| 2019/0320164 | A1* | 10/2019 | Salahieh | H04N 13/282 |
| 2020/0260102 | A1* | 8/2020 | Lin | H04N 19/70 |
| 2021/0006764 | A1* | 1/2021 | Shin | G06T 3/4038 |
| 2021/0250600 | A1* | 8/2021 | Kuma | G06T 9/00 |
| 2021/0337243 | A1* | 10/2021 | Oh | H04N 19/597 |

OTHER PUBLICATIONS

Basel Salahieh et al., "Test Model for Immersive Video", Coding of moving pictures and audio, ISO/IEC JTC 1/SC 29/WG 11, N18470, Mar. 2019, International Organisation for Standardisation, Geneva, CH.

Hong-Chang Shin et al., "[MPEG-I Visual] Priority-based View Pruning", Coding of Moving Pictures and Audio, ISO/IEC JTC1/SC29/WG11 MPEG2019/M49150, Jul. 2019, Gothenburg, Sweden.

* cited by examiner

VIDEO ENCODING METHOD AND VIDEO DECODING METHOD

CROSS REFERENCE TO RELATED APPLICATION

The present application claims priority to Korean Patent Application No. 10-2019-0071116 filed Jun. 14, 2019 and No. 10-2020-0070070 filed Jun. 10, 2020, the entire contents of which is incorporated herein for all purposes by this reference.

BACKGROUND OF THE INVENTION

1. Field of the Invention

The present disclosure relates to a 360-degree virtual reality (VR) image processing method. More particularly, the present disclosure provides a method of efficiently encoding and decoding a plurality of view images of a 360-degree VR image.

2. Description of the Related Art

Immersion may be defined as a phenomenon wherein reality and virtual reality become unclear by reproducing a virtual world which is difficult to be distinguished from reality. Immersive media includes audio, video, etc. which makes a user experience immersion. Considering that an environment in which media is consumed changes from PCs to smartphones, immersive media increases a sense of immersion in various VR apparatuses such as head mounted displays (HMDs) and various types of large display environments composed of multiple TVs. In particular, related technologies are being developed with the goal of providing six degrees of freedom (6DoF), such that users may experience free motion from the viewpoint of immersive video.

Conventional multi-view image compression technology considered only compression of a multi-view image required for a relatively small unidirectional viewing space. However, since immersive video considers a view image required for an omnidirectionally extended viewing space, the number of view images increases. In addition, as the field of view increases, resolution also increases. Accordingly, it is necessary to solve the problem of an increase in pixel rate reflecting input/output interface and the amount of data for compression processing.

SUMMARY OF THE INVENTION

The present disclosure relates to a 360-degree virtual reality (VR) image processing apparatus and method. The present disclosure provides a method and apparatus for efficiently encoding and decoding a plurality of view images of a 360-degree VR image. More specifically, a method of determining an optimal pruning order for encoding and decoding a plurality of reference view images.

According to the present disclosure, provided is a video encoding method of encoding a multi-view image including one or more basic view images and a plurality of reference view images including determining a pruning order of the plurality of reference view images, acquiring a plurality of residual reference view images, by pruning the plurality of reference view images based on the one or more basic view images according to the pruning order, encoding the one or more basic view images and the plurality of residual reference view images, and outputting a bitstream including encoding information of the one or more basic view images and the plurality of residual reference view images.

According to an embodiment, the determining of the pruning order of the plurality of reference view images may include determining the pruning order of the plurality of reference view images according to a size of an overlapping area between a reference view image and a basic view image.

According to an embodiment, the size of the overlapping area between the reference view image and the basic view image may be determined according to overlapping pixels between the reference view image and a warped basic view image obtained by warping the basic view image to the reference view.

According to an embodiment, the determining of the pruning order of the plurality of reference view images may include determining the pruning order of the plurality of reference view images according to image indices of the plurality of reference view images, and wherein each of the image indices may be an acquisition order of the plurality of reference view images.

According to an embodiment, the determining of the pruning order of the plurality of reference view images may include determining the pruning order of the plurality of reference view images according to camera parameters of the plurality of reference view images, and the camera parameters may include a position and/or an angle of a camera.

According to an embodiment, the determining of the pruning order of the plurality of reference view images may include acquiring, from the plurality of reference view images, a plurality of first residual reference view images, from which an overlapping area between the plurality of reference view images and the basic view images is removed, warping the plurality of first residual view images to a basic view, and determining the pruning order of the plurality of reference view images according to the number of pixels of each of the plurality of warped first residual reference view images.

According to an embodiment, the acquiring of the plurality of residual reference view images by pruning the plurality of reference view images based on the one or more basic view images according to the pruning order may include acquiring a plurality of primary pruning reference view images obtained by removing the overlapping area between the plurality of reference view images and the basic view images from the plurality of reference view images, based on the one or more basic view images, and acquiring the plurality of residual reference view images by removing an overlapping area between the plurality of primary pruning reference view images according to the pruning order.

According to an embodiment, the acquiring of the plurality of residual reference view images by removing the overlapping area between the plurality of primary pruning reference view images according to the pruning order may include acquiring the plurality of residual reference view images, by removing, from a primary pruning reference view image of a post-order according to the pruning order, an overlapping area between a primary pruning reference view image of a pre-order according to the pruning order and the primary pruning reference view image of the post-order according to the pruning order.

According to an embodiment, the encoding of the one or more basic view images and the plurality of residual reference view images may include packing a plurality of distributed valid areas included in the residual reference view images into one valid area, and encoding a residual reference view image including the packed valid area and packing information of the residual reference view.

According to an embodiment, the encoding information may include pruning order information indicating a pruning order of the basic view images and the residual reference view images.

According to an embodiment, the pruning order information may be included in a frame header, a frame group header and/or a video header, the pruning order information of the frame header may be applied to a frame corresponding to the frame header, the pruning order information of the frame group header may be applied to all frames of a frame group corresponding to the frame group header, and the pruning order information of the video header may be applied to all frames of a video.

In the present disclosure, provided is a video decoding method of decoding a multi-view image including one or more basic view images and a plurality of reference view images including acquiring a bitstream including encoding information of one or more basic view images and a plurality of residual reference view images, decoding the one or more basic view images and the plurality of residual reference view images based on the encoding information, determining a pruning order of the plurality of reference view images, and reconstructing the plurality of reference view images from the plurality of residual reference view images based on the pruning order and the one or more basic view images.

According to an embodiment, the determining of the pruning order of the plurality of reference view images may include determining the pruning order of the plurality of reference view images according to image indices of the plurality of reference view images, and each of the image indices may be an acquisition order of the plurality of reference view images.

According to an embodiment, the determining of the pruning order of the plurality of reference view images may include determining the pruning order of the plurality of reference view images according to camera parameters of the plurality of reference view images, and the camera parameters may include a position and/or an angle of a camera.

According to an embodiment, the determining of the pruning order of the plurality of reference view images may include determining the pruning order of the plurality of reference view images according to pruning order information indicating the pruning order of the plurality of reference view images included in the encoding information.

According to an embodiment, the pruning order information may be included in a frame header, a frame group header and/or a video header, the pruning order information of the frame header may be applied to a frame corresponding to the frame header, the pruning order information of the frame group header may be applied to all frames of a frame group corresponding to the frame group header, and the pruning order information of the video header may be applied to all frames of a video.

According to an embodiment, the reconstructing of the plurality of reference view images from the plurality of residual reference view images according to the pruning order and the one or more basic view images may include acquiring a plurality of primary pruning reference view images from the plurality of residual reference view images according to the pruning order, and reconstructing the plurality of reference view images according to the plurality of primary pruning reference view images and the one or more basic view images.

According to an embodiment, the acquiring of the plurality of primary pruning reference view images from the plurality of residual reference view images according to the pruning order may include acquiring a primary pruning reference view image of a post-order according to the pruning order from a residual reference view image of a post-order according to the pruning order, based on an overlapping area between a residual reference view image of a pre-order according to the pruning order and the residual reference view image of the post-order according to the pruning order.

According to an embodiment, the decoding of the one or more basic view images and the plurality of residual reference view images based on the encoding information may include acquiring packing information of the residual reference view images from the bitstream and acquiring a residual reference view image including a plurality of distributed valid area from a residual reference view image packed into one valid area according to the packing information.

In the present disclosure, provided is a non-transitory computer-readable recording medium including a bitstream in which a multi-view image including one or more basic view images and a plurality of reference view images is encoded. The bitstream includes basic view image encoding information of the one or more basic view images, reference view encoding information of a plurality of residual reference view images of the plurality of reference view images, and pruning order information indicating a pruning order of the plurality of reference view images, and the plurality of residual reference view images is acquired by pruning the plurality of reference view images based on the one or more basic view images according to the pruning order.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
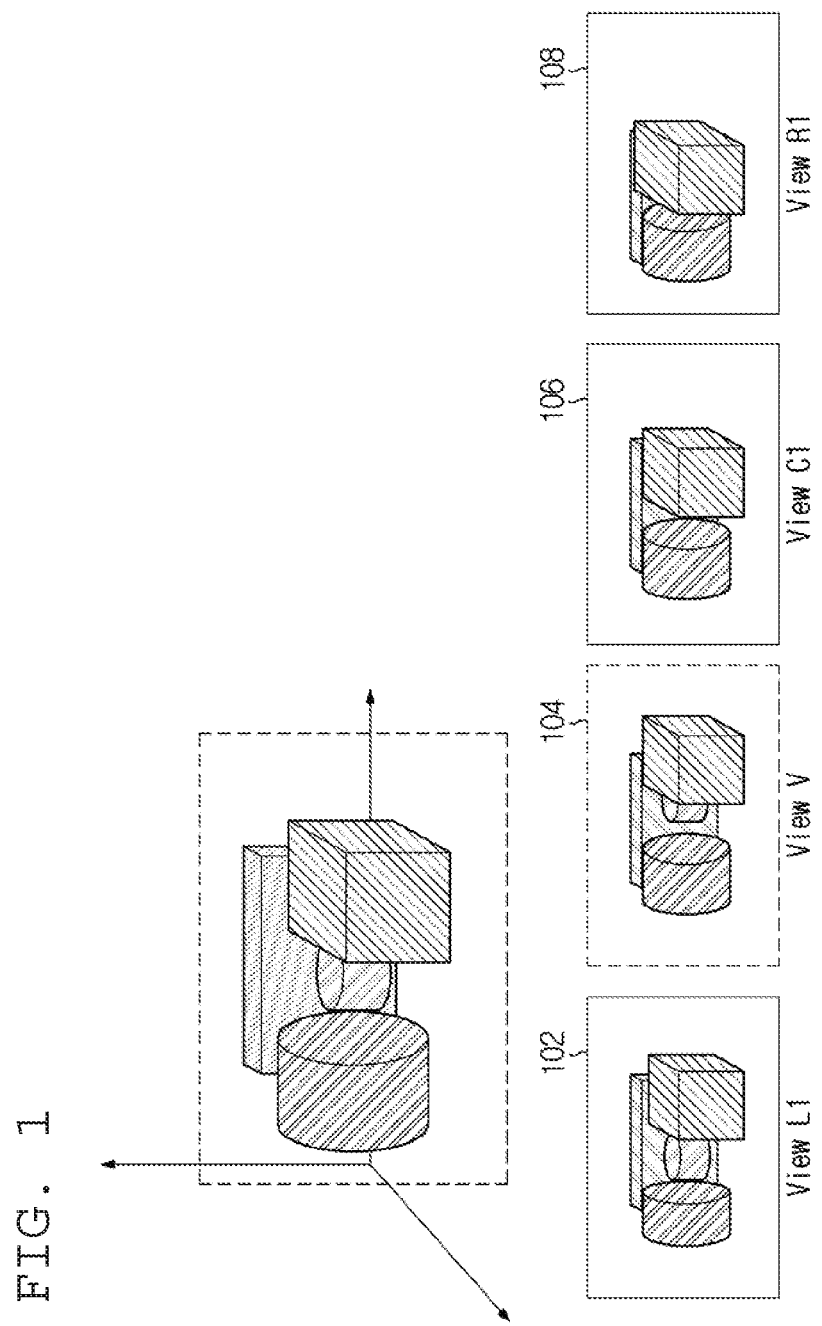
FIG. 1 is a view showing view images acquired by a plurality of cameras located at different points of view.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present specification, well-known functions or constructions will not be described in detail since they may unnecessarily obscure the understanding of the present invention. The same constituent elements in the drawings are denoted by the same reference numerals, and a repeated description of the same elements will be omitted.

FIG. 1 is a view showing view images acquired by a plurality of cameras located at different points of view.

According to an embodiment, at least one of view images captured by a plurality of cameras may be set as a basic view image. For example, a third view image 106 may be set as a basic view image. Alternatively, instead of the third view image 106, a first view image 102, a second view image 104 or a fourth view image 108 may be set as a basic view image. In addition, two or more view images may be set as basic view images.

According to an embodiment, based on the basic view image, the view images captured at different points of view may be set as reference view images. For example, when the third view image 106 is set as the basic view image, the first view image 102, the second view image 104 and the fourth view image 108 may be set as the reference view images.

According to an embodiment, a virtual view image may be generated by synthesizing a plurality of view images at different points of view. For example, the second view image 104 may be a virtual view image generated by synthesizing the first view image 102 and the third view image 106. In this case, an occluded area which is not visible in the third view image 106 may be visible in the second view image 104. Since a portion of an object corresponding to the occluded area of the third view image 106 is visible in the first view image 102, the occluded area of the second view image 104 which is the virtual view image may be reconstructed by referring to the first view image 102.

Figure 2:
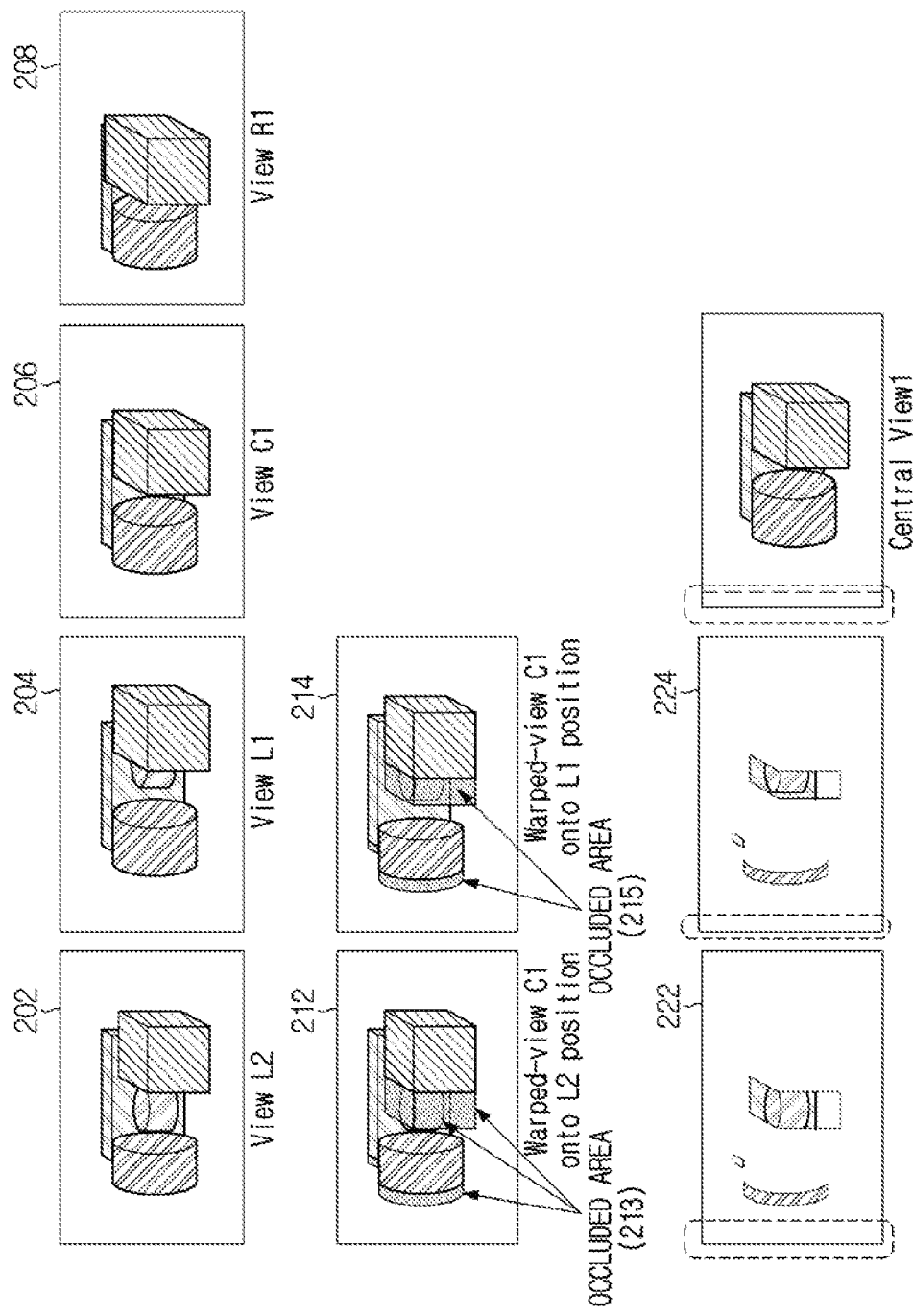
FIG. 2 is a view showing a method of reducing the amount of data of a reference view image by removing overlapping image data between a basic view and a reference view.

FIG. 2 is a view showing a method of reducing the amount of data of a reference view image by removing overlapping image data between a basic view and a reference view.

In FIG. 2, it is assumed that a third view image 206 is a basic view image and a first view image 202, a second view image 204 and a fourth view image are reference view images. However, unlike FIG. 2, another view image may be set as a basic view image.

First, the depth information of the third view image 206 as the basic view image and the first view image 202, the second view image 204 and the fourth view image 208 as the reference view images are acquired. The depth information indicates a distance between the camera capturing each view and the object of the view image.

In addition, based on the depth information and a three-dimensional (3D) geometric relationship between views, the third view image 206 is subjected to 3D view warping and mapped according to the views of the reference view images 202, 204 and 208. As the result of 3D view warping and mapping, a transformed view image of each reference view is generated. For example, a first transformed view image 212 may be generated by transforming the third view image 206 based on the view of the first view image 202. Similarly, a second transformed view image 214 may be generated by transforming the third view image 206 based on the view of the second view image 204.

A partial area of the reference view image may not be visible in the transformed view image generated from the basic view image. For example, the third view image 206 may include an occluded area which is visible in the other view images but is not visible in the third view image 206. Accordingly, a partial area of the first view image 202 may not be visible in the first transformed view image 212 generated from the third view image 206. Similarly, a partial area of the second view image 204 may not be visible in the second transformed view image 214 generated from the third view image 206.

As described above, an area which is visible in the reference view image generated from a central reference view but is not visible in the transformed view image may be defined as a hole area. For example, a first occluded area 213 which is visible in the first view image 202 but is not visible in the first transformed view image 212 may be determined as a hole area. Similarly, a second occluded area 213 which is visible in the second view image 204 but is not visible in the second transformed view image 214 may be determined as a hole area.

The remaining area other than the hole area in the transformed view image may be visible in the basic view image. Therefore, the amount of data of the reference view image may be reduced by removing, from the reference view image, an overlapping area (that is, the remaining area other than the hole area) between the reference view image and the basic view image. Accordingly, a residual view image indicating a difference between the reference view image and the transformed view image generated from the basic view image may be generated. As a result, the residual view image includes only the area which may be visible only in the reference view image.

For example, a first residual view image 222 may be generated by removing, from the first view image 202, an area which is commonly visible in the first view image 202 and the first transformed view image 212. Similarly, a second residual view image 224 may be generated by removing, from the second view image 204, an area which is commonly visible in the second view image 204 and the second transformed view image 214.

According to an embodiment, an overlapping area between the reference view image and the transformed view image may be determined, by comparing texture information and/or depth information of pixels located at the same coordinates or corresponding coordinates of the reference view image and the transformed view image. For example, a pixel at which texture information and depth information of the reference view image and the transformed view image are determined to be equal and/or similar to each other may be determined as an overlapping pixel. Alternatively, the overlapping pixel may be determined only by one of the texture information or the depth information.

According to an embodiment, when comparing texture information and/or depth information of pixels located in corresponding coordinates between the reference view image and the transformed view image, images based on a 3D spatial coordinate system that is generated through an unprojection process may be used instead of images based on an image coordinate system that is generated through an unprojection and reprojection process. Here, unprojection means converting an image of a 2D image coordinate system into a 3D spatial coordinate system, and reprojection means converting an image of a 3D spatial coordinate system into an image of a 2D image coordinate system.

FIG. 2 shows an embodiment in which the basic view image and the reference view image are compared by transforming the basic view image according to the view of the reference view image. However, on the contrary, the basic view image and the reference view image are compared by transforming the reference view image according to the view of the basic view image. In addition, the overlapping area between the basic view image and the reference view image according to the result of comparison may be excluded from the reference view image.

Figure 3:
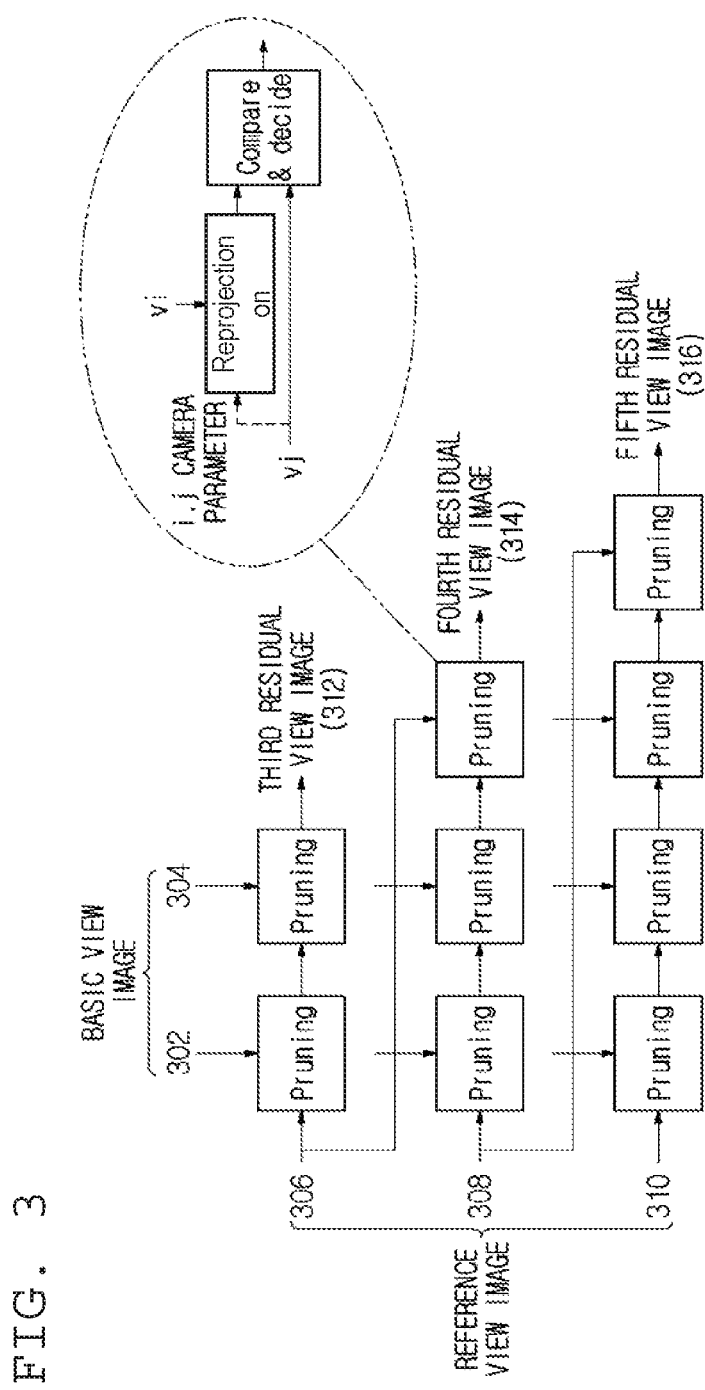
FIG. 3 is a flowchart illustrating a pruning process for removing overlapping data between view images.

FIG. 3 is a flowchart illustrating a pruning process for removing overlapping data between view images. Specifically, FIG. 3 shows an embodiment of a pruning process of five view images. The pruning process is applicable to the depth component of an image. In addition, the pruning process is applicable not only to the depth component but also to a texture component of the image.

First, a basic view image and a reference view image are distinguished based on a predetermined algorithm. The predetermined algorithm may be determined according to at least one of the index of the camera, the position of the camera, the rotation angle of the camera, the priority between cameras or the position of a region of interest (ROI). In FIG. 3, a first view image 302 and a second view image 304 are set as basic view images. In addition, a third view image 306, a fourth view image 308 and a fifth view image 310 are set as reference view images. Unlike FIG. 3, another view image may be set as a basic view image.

The basic view image is the highest priority in the pruning order, and the pruning process is not performed for the basic view image. That is, since the first view image 302 and the second view image 304 are the basic view images, the image information of the first view image 302 and the second view image 304 is the highest priority in the pruning order. Thus, it may not be removed or compressed by the pruning process. In the pruning order, a non-pruning view, such as a basic view image, may be designated and marked separately and encoded.

However, the pruning process may be performed with respect to the reference view images. Accordingly, the overlapping area between the reference view image and the basic view image may be removed by the pruning process. Therefore, the image information of the third view image 306, the fourth view image 308 and the fifth view image 310 may be removed or compressed according to the pruning process based on the first view image 302 and the second view image 304. The lowest priority among reference view images may be defined as a leaf view image. In addition, the highest priority among reference view images may be defined as a root view image.

In the pruning process, the overlapping area may be determined according to the texture and/or depth information of the pixel. According to an embodiment, based on the depth information and the camera calibration information, the reference view image may be transformed according to 3D view warping and mapping based on the basic view. The texture and/or pixel information of the pixel of the transformed view image generated by transforming the reference view image and the pixel of the basic view image may be compared. In addition, upon determining that the pixel of the transformed view image and the pixel of the basic view image are substantially the same as the result of comparison, it may be determined that the pixel of the reference view image corresponding to the pixel of the transformed view image is included in the overlapping area.

For example, a third transformed view image may be generated by transforming the third view image 306 according to the view of the first view image 302. In addition, the overlapping area between the first view image 302 and the third view image 306 may be determined by comparing the third transformed view image with the first view image 302. The overlapping area between the second view image 304 and the third view image 306 may be determined using the same method.

When 3D view warping and mapping based on depth information and camera calibration information, actual depth information corresponding to all pixels of each reference viewpoint may be used. Alternatively, a predetermined number of pixels are sampled within a depth range set as maximum depth information and minimum depth information that can be expressed at a corresponding reference view position, and the sampled pixels are sampled. An overlapping region may be calculated in a 3D space reconstructed by unprojecting the sampled pixels onto a 3D world coordinate system.

In the pruning process, the overlapping area between the basic view image and the reference view area may be removed from the reference view image. Accordingly, a residual view image indicating only information on an object which is not included in the basic view image may be generated from the reference view image. For generation of the residual view image, a mask map for blocking the overlapping area between the reference view image and the basic view image may be generated from the reference view image. In addition, the residual view image may be generated by removing the overlapping area from the reference view image according to the generated mask map.

For example, a third residual view image 312 of the third view image 306 may be generated by excluding, from the third view image 306, the overlapping area between the first view image 302 and the third view image 306 and the overlapping area between the second view image 304 and the third view image 306. For generation of the third residual view image 312, a third view mask map for blocking the overlapping area between the third view image 306 and the first view image 302 and the overlapping area between the third view image 306 and the second view image 304 may be generated from the third view image 306. In addition, the third residual view image 312 may be generated by blocking, from the third view image 306, the overlapping area between the third view image 306 and the first view image 302 and the overlapping area between the third view image 306 and the second view image 304 according to the third view mask map.

Similarly, a fourth residual view image 314 of the fourth view image 308 may be generated. Like the third residual view image 312, a fourth view mask map for blocking the overlapping area between the fourth view image 308 and the first view image 302 and the overlapping area between the fourth view image 308 and the second view image 304 may be determined. In addition, the fourth residual view image 314 may be generated by excluding, from the fourth view image 308, the overlapping area indicated by the fourth view mask map.

In order to generate the residual view image, in addition to the basic view image, an overlapping area with the other reference view image may be further considered. Therefore, the amount of data of the residual view image may be further reduced, by further excluding, from the reference view image, the overlapping area between the reference view images in addition to the overlapping area between the basic view image and the reference view image.

For example, the overlapping area between the fourth view image 308 and the third view image 306 may be removed from the fourth view image 308. By further considering the overlapping area between the fourth view image 308 and the third view image 306, the fourth residual view image 314 may be further reduced. Similarly, in order to generate a fifth residual view image 316 of the fifth view image 310, the overlapping areas between the fifth view image 310 and the first view image 302 to the fourth view image 308 may be excluded from the fifth view image 310.

According to an embodiment, a reference view image of a pre-order, which is warped to a post-order reference view, may be used for pruning of a reference view image of a post-order. The camera parameters of the reference view of the pre-order and the reference view of the post-order are applicable to the warping process. The camera parameters may include the capturing position and/or the capturing angle of the camera. The priority of the reference view and the reference view image mean the pruning order of the reference view image.

The residual view image generated by the pruning process based on the basic view image and the reference view image includes only pixels corresponding to the occluded area which is not visible in the basic view image. Additionally, when a secondary pruning process based on a reference view image different from the current reference view image is performed, the residual view image may include pixels corresponding to the occluded area which is not visible even in the other reference view images.

The secondary pruning process may be performed using the residual view image in which pruning is completed. For example, when the third to fifth view images 306, 308 and 310, which are the reference view images, are sequentially pruned, only the overlapping area originating from the first view image 302 and the second view image 304 may be considered in the pruning process of the third view image 306. In addition, in the pruning process of the fourth view image 308, the overlapping area from the third view image 306 may also be considered in addition to the first view image 302 and the second view image 304. In addition, in the pruning process of the fifth view image 310, the overlapping area originating from the third view image 306 and the fourth view image 308 may also be considered in addition to the first view image 302 and the second view image 304.

The compression efficiency of the reference view images may vary according to the pruning order of the reference view image. As the overlapping area according to the reference view image of the pre-order is removed from the reference view image of the post-order, the encoding rate of the reference image of the post-order may be higher than that of the reference image of the pre-order. The pruning order of the reference view image may be determined based on a camera index or a view image acquisition order. Alternatively, the pruning order of the reference view image may be determined based on the image index or view index of each view image.

Figure 4:
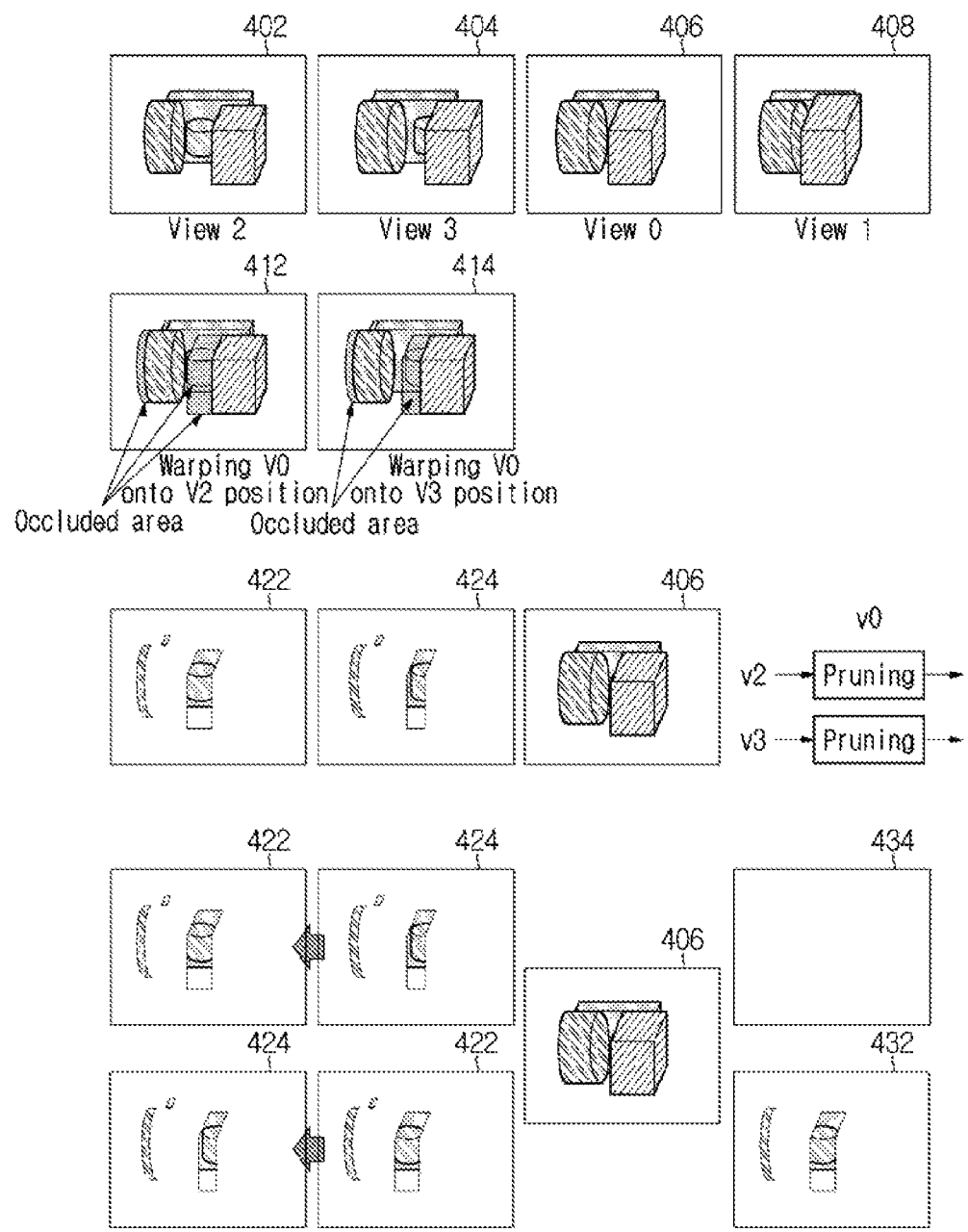
FIG. 4 is a view showing a residual view image according to a pruning order of reference view images.

FIG. 4 is a view showing a residual view image according to a pruning order of reference view images.

In FIG. 4, it is assumed that a third view image 406 and a fourth view image 408 are basic view images and a first view image 400 and a second view image 404 are reference view images.

A first transformed view image 412 may be generated by warping the third view image 406 and the fourth view image 408 according to the depth information of the first view image 402. In addition, a second transformed view image 414 may be generated by warping the third view image 406 and the fourth view image 408 according to the depth information of the second view image 404. By comparing the first view image 402 with the first transformed view image 412, the overlapping area and the hole area of the first view image 402 and the third and fourth view images 406 and 408 may be derived. Similarly, by comparing the second view image 404 with the second transformed view image 414, the overlapping area and the hole area of the second view image 404 and the third and fourth view images 406 and 408 may be derived. In FIG. 4, the hole areas refer to an area which is visible in the first view image 402 but is not visible in the first transformed view image 412 and an area which is visible in the second view image 404 but is not visible in the second transformed view image 414.

By removing, from the first view image 40, the overlapping area between the first view image 402 and the first transformed view image 412, a first residual view image 422 is generated. In addition, by removing, from the second view image 404, the overlapping area between the second view image 404 and the second transformed view image 414, a second residual view image 424 is generated. The first residual view image 422 and the second residual view image 424 include pixels corresponding to the occluded areas of the first view image 402 and the second view image 404.

A secondary pruning process may be performed with respect to the first residual view image 422 and the second residual view image 424. When the overlapping area is removed in the second pruning process, similarly to the case where the overlapping area is removed in the primary pruning process, warping images of the first residual view image 422 or the second residual view image 424 may be used.

When the pruning order of the first view image 402 is faster than that of the second view image 404, a fourth residual view image 434 may be generated by removing, from the second residual view image 424, the overlapping area between the first residual view image 422 and the second residual view image 424. In addition, additional pruning of the first residual view image 422 is not performed. Accordingly, the first residual view image 422 and the fourth residual view image 434 become final results according to the pruning process.

In contrast, when the pruning order of the second view image 404 is faster than that of the first view image 402, a third residual view image 432 may be generated by removing, from the first residual view image 422, the first residual view image 422 and the second residual view image 424. In addition, additional pruning of the second residual view image 424 is not performed. Accordingly, the second residual view image 424 and the third residual view image 432 become final results according to the pruning process.

When the third residual view image 432 and the fourth residual view image 434 of FIG. 4 are compared, it can be seen that the amount of data included in the residual view image varies according to the pruning order. According to FIG. 4, the first residual view image 422 includes all data of the second residual view image 424. Therefore, it can be seen that there is no data in the fourth residual view image 434 generated by excluding the overlapping area with the first residual view image 422 from the second residual view image 424. In contrast, it can be seen that data remains in the third residual view image 432 generated by excluding the overlapping area with the second residual view image 424 from the first residual view image 422.

When the pruning order of the first view image 402 is faster than that of the second view image 404, the hole areas of one object may be distributed only in the first residual view image 422 between the first residual view image 422 and the fourth residual view image 434. In contrast, when the pruning order of the second view image 404 is faster than that of the first view image 402, the hole areas of one object may be divided into and distributed in the second residual view image 424 and the third residual view image 432.

When the residual view images generated as the result of pruning are packed in units of images, when information on one object is concentratedly distributed in one residual view image, compression efficiency and image quality are more advantageous as compared to the case where the information on one object is divided into and distributed in a plurality of residual view images. Therefore, considering that there is no data of the fourth residual view image 434, the amount of data according to the first residual view image 422 and the fourth residual view image 434 is likely to be less than the amount of data according to the second residual view image 424 and the third residual view image 432. Accordingly, when the pruning order of the first view image 402 is faster than that of the second view image 404, encoding efficiency may increase. Therefore, it is possible to increase encoding efficiency, by concentrating data on one residual view image.

Figure 5:
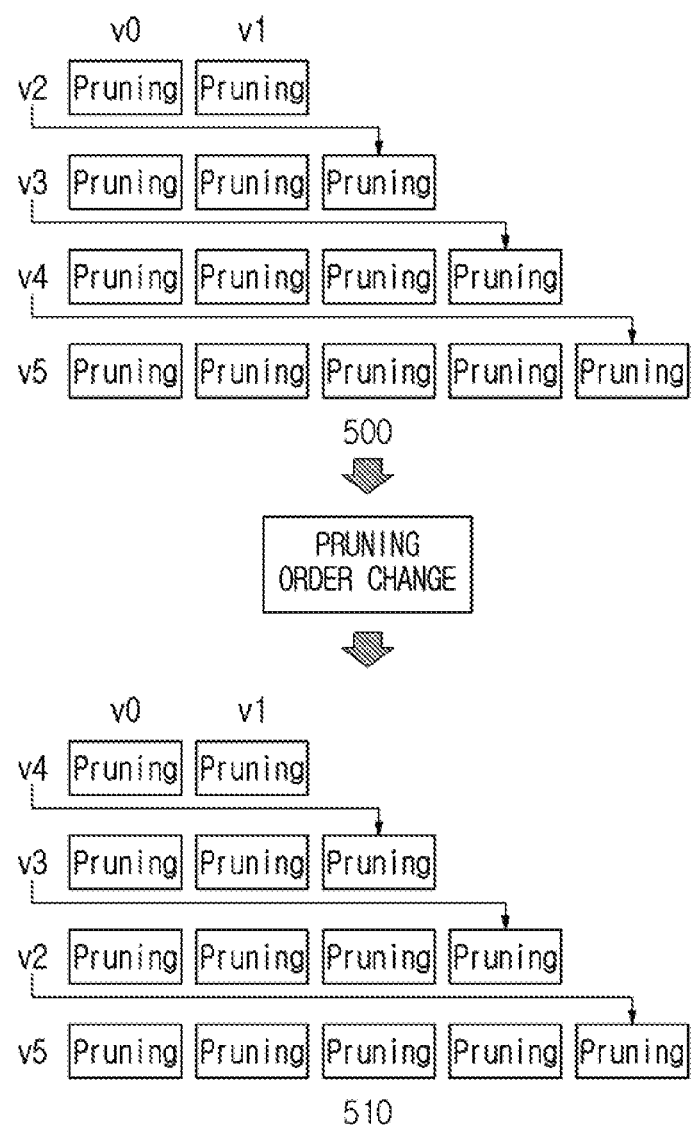
FIG. 5 is a view showing a method of determining a pruning order of reference view images in order to improve encoding efficiency.

FIG. 5 is a view showing a method of determining a pruning order of reference view images in order to improve encoding efficiency.

According to a first pruning order 500, reference view images v2, v3, v4 and v5 are pruned in order of v2, v3, v4 and v5. Accordingly, the reference view image v2 is pruned based on the basic view images v0 and v1. In addition, the reference view image v3 is pruned based on the basic view images v0 and v1 and the reference view image v2. In addition, the reference view image v4 is pruned based on the basic view images v0 and v1 and the reference view images v2 and v3. In addition, the reference view image v5 is pruned based on the basic view images v0 and v1 and the reference view images v2, v3 and v4.

As described above, encoding efficiency may increase by optimizing the pruning order. Therefore, the pruning order of the reference view images v2, v3, v4 and v5 may be changed based on a predetermined criterion. The pruning order may be determined based on at least one of the size of the overlapping area between the reference view image and the basic view image, the size of the hole area present in the reference view image or an image acquisition order (or an image index).

According to an embodiment, the pruning order may be determined based on a ratio of the number of overlapping pixels (that is, the size of the overlapping area) included in the overlapping area between the reference view image and the basic view image to all pixels. It is determined that a reference view image having a small overlapping area has relatively more information which is not visible in the basic view image. Accordingly, a high priority may be given to a reference view image having a small overlapping area. Here, the high priority means that the pruning order is fast. That is, the pruning process may be preferentially performed with respect to the reference view image having the small overlapping area. Accordingly, in the secondary pruning process of a reference view image having a large overlapping area, a reference view image having a relatively small overlapping area may be used.

When the number of basic view images is two or more, the pruning order may be determined based on the average value, sum, maximum value or minimum value of the sizes of the overlapping areas of the basic view images. For example, the priority of the reference view image may be determined based on the sum of the sizes of the overlapping area with the first basic view image and the overlapping area with the second basic view image.

According to an embodiment, the pruning order may be determined according to the image acquisition order (or the image index). For example, the pruning order may be determined by inverting the image acquisition order of the reference view images. Accordingly, when the first reference view image and the second reference view image are sequentially acquired, the pruning order of the second reference view image may be set to precede the pruning order of the first reference view image.

According to an embodiment, the pruning order may be determined according to a difference in camera parameter between the basic view image and the reference view image. The camera parameter indicates the position and direction of the camera view. For example, when the difference in camera view and/or direction between the reference view image and the basic view image is large, the reference view image may be set to have a high priority in the pruning order. In contrast, when the difference in camera view and/or direction between the reference view image and the basic view image is small, the reference view image may be set to have a low priority in the pruning order.

According to an embodiment, the pruning order may be determined according to the transformed residual view images warped to the basic view. For example, the pruning order may be determined according to the number of pixels of the transformed residual view image warped to the basic view. When the number of pixels of the transformed residual view image is large, the residual view image corresponding to the transformed residual view image may be determined to have a high priority in secondary pruning. When the number of pixels of the transformed residual view image is small, the residual view image corresponding to the transformed residual view image may be determined to have a low priority in secondary pruning.

Figure 6:
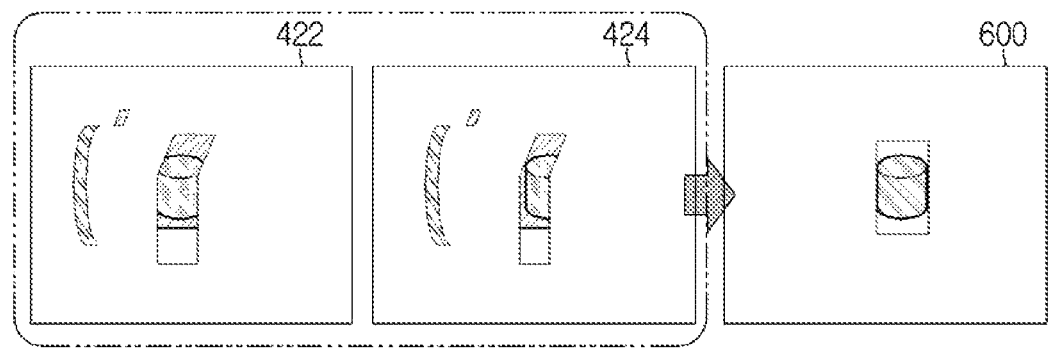
FIG. 6 is a view illustrating an embodiment of a method of determining a pruning order according to the number of pixels of a transformed residual view image.

FIG. 6 is a view illustrating an embodiment of a method of determining a pruning order according to the number of pixels of a transformed residual view image.

By warping the first residual view image 422 and the second residual view image 424 to the view of the third view image 406 of FIG. 4, the transformed residual view image 600 of the first residual view image 422 and the second residual view image 424 is determined. Occluded areas of the third view image 406 and the fourth view image 408, which are visible in the first view image 402 and the second view image 404, appear in the transformed residual view image 600.

To determine the pruning order, the number of pixels derived from the first residual view image 422 among the pixels of the transformed residual view image 600 is determined. In addition, the number of pixels derived from the second residual view image 424 among the pixels of the transformed residual view image 600 is determined. In addition, the pruning order is determined in descending order of the number of derived pixels. Therefore, the pruning order of the first residual view image 422 having a large number of derived pixels may be determined to have a high priority.

When the number of basic view images is two or more, the transformed residual view image of each basic view is determined. In addition, the number of derived pixels is determined from the residual view image among the pixels of each transformed residual view image. In addition, the pruning order may be determined according to the number of derived pixels.

For example, a first transformed residual view image and a second transformed residual view image are determined with respect to a first basic view and a second basic view. In addition, the number of pixels derived from the first residual view image among the pixels of the first transformed residual view image and the number of pixels derived from the first residual view image among the pixels of the second transformed residual view image are determined. In addition, the average value of the numbers of pixels derived from the first residual view image is determined. Similarly, the number of pixels derived from the second residual view image among the pixels of the first transformed residual view image and the number of pixels derived from the second residual view image among the pixels of the second transformed residual view image are determined. In addition, an average value of the numbers of pixels derived from the second residual view images is determined. In addition, by comparing the average value of the numbers of pixels derived from the first residual view image and the average value of the numbers of pixels derived from the second residual view image, the pruning order of the first residual view image and the second residual view image may be determined.

When a plurality of basic view images is present, the comparison order of the reference view image and the plurality of basic view images may also be variably determined. To this end, first, in FIG. 5, after primary pruning for simultaneously pruning all reference view images based on the basic view image, a secondary pruning order is determined and then secondary pruning is performed.

Images may be divided into a plurality of groups and a pruning process may be independently performed for each group. One group may include at least one image and one group may necessarily include one basic view image. For example, a reference view image included in a first group is pruned based on a basic view image and a reference view image included in the first group, and a reference view image included in a second group may be pruned based on a basic view image and a reference view image included in the second group.

Figure 7:
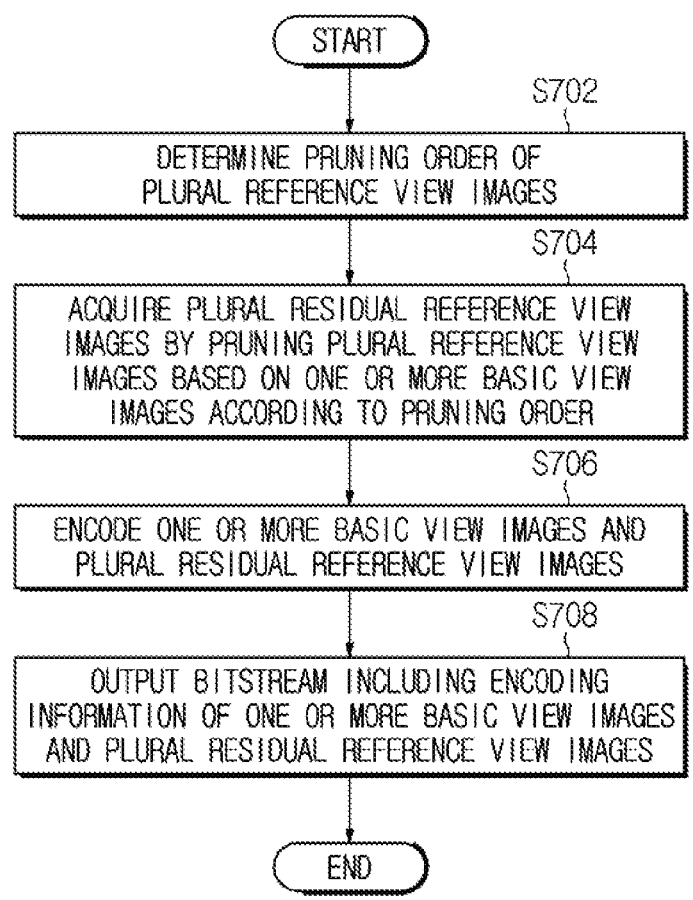
FIG. 7 is a flowchart illustrating an embodiment of a video encoding method for encoding a multi-view image including one or more basic view images and a plurality of reference view images.

FIG. 7 is a flowchart illustrating an embodiment of a video encoding method for encoding a multi-view image including one or more basic view images and a plurality of reference view images.

According to an embodiment, a basic viewpoint image having a highest priority pruning order is determined.

In step 702, the pruning order of a plurality of reference view images is determined.

According to an embodiment, the pruning order of the plurality of reference view images may be determined according to the size of the overlapping area between the reference view image and the basic view image. The reference view image is assigned to a lower priority than the base view image. In the pruning order, a non-pruning view, such as a basic view, can be specified and marked separately, and encoded. The size of the overlapping area between the reference view image and the basic view image may be determined according to the pixels overlapping between the warped basic view image and the reference view image according to the reference view.

According to an embodiment, the pruning order of the plurality of reference view images may be determined according to the image indices of the plurality of reference view images. The image index may be an acquisition order of the plurality of reference view images.

According to an embodiment, the pruning order of the plurality of reference view images is determined according to the camera parameters of the plurality of reference view images. The camera parameters include the position and/or angle of the camera.

According to an embodiment, a plurality of first residual reference view images, from which the overlapping areas between the plurality of reference view image and the basic view image are removed, is acquired from the plurality of reference view images. In addition, the pruning order of the plurality of reference view images may be determined according to the number of pixels of each of the plurality of first residual reference views according to the basic view.

In step 704, a plurality of residual reference view images is acquired by pruning the plurality of reference view images based on one or more basic view images according to the pruning order.

According to an embodiment, a plurality of primary pruning reference view images, from which the overlapping areas between the plurality of reference view images and the basic view image are removed, may be acquired from the plurality of reference view images, based on one or more basic view images. In addition, by removing the overlapping areas between the plurality of primary pruning reference view images according to the pruning order, the plurality of residual reference view images may be acquired. Specifically, by removing, from the primary pruning reference view image of the post-order according to the pruning order, the overlapping areas between the primary pruning reference view image of the pre-order according to the pruning order and the primary pruning reference view of the post-order according to the pruning order, the plurality of residual reference view images may be acquired.

In step 706, one or more basic view images and the plurality of residual reference view images are encoded.

In step 708, a bitstream including encoding information of one or more basic view images and the plurality of residual reference view images is output.

According to an embodiment, a plurality of distributed valid areas may be included in the residual reference view image. Accordingly, the plurality of distributed valid areas may be packed into one valid area. For packing of the valid areas, the plurality of valid areas may be resized, rotated and/or moved. Packing information indicates how the plurality of valid areas has been resized, rotated and/or moved.

the plurality of valid areas of multiple residual view images may be packed into one image. Packing information and source information of each valid area may be encoded. The source information may be an index identifying a reference view image from which a valid area is derived.

In addition, the residual reference view image including one packed valid area and packing information of the residual reference view may be encoded. The valid area is defined as an area including information not overlapping the basic view image in the reference view area. Since one packed valid area is less than the whole area of the image, encoding efficiency is improved according to packing of the image.

According to an embodiment, the encoding information may include information regarding pruning order.

According to an embodiment, Information indicating the number of base view images or information for specifying the base view image may be encoded. For example, information specifying the index of the base view image may be encoded.

According to an embodiment, Information indicating the pruning order between viewpoint images may be encoded. A viewpoint image having a low pruning order may be reconstructed by referring to a viewpoint image having a high pruning order. The pruning order of the base view image is set to take precedence over the pruning order of the reference view image. Therefore, the reference view image is arranged in a lower order than the basic view image. In the pruning order, a non-pruning view, such as a basic view image, can be distinguished from a reference view image and displayed as separate information.

According to an embodiment, Information about the pruning group may be encoded. At least one of information indicating the number of pruning groups or information specifying the pruning group to which the viewpoint image belongs may be encoded. The viewpoint image may be reconstructed with reference to another viewpoint image belonging to the same pruning group as the viewpoint image.

According to an embodiment, Information about the pruning pattern may be encoded. The pruning pattern represents a one-dimensional pattern or a two-dimensional pattern. The one-dimensional pattern indicates that up to one other reference viewpoint image is available when pruning the reference viewpoint image. The two-dimensional pattern indicates that a plurality of different reference viewpoint images are available when pruning the reference viewpoint images.

According to an embodiment, Information indicating whether the viewpoint image is a leaf viewpoint image may be encoded. When the viewpoint image is a leaf viewpoint image, the corresponding viewpoint image is not used for pruning another viewpoint image. On the other hand, when it indicates that the viewpoint image is not a leaf viewpoint image, the viewpoint image may be used for pruning another viewpoint image. When the viewpoint image is not a leaf viewpoint image, information on the number of next-order viewpoint images and the identifier of the next-rank viewpoint images may for pruning may be encoded.

According to an embodiment, Information indicating whether the viewpoint image is a root viewpoint image may be encoded. When the viewpoint image is a root viewpoint image, the corresponding viewpoint image is not pruned. On the other hand, when it indicates that the viewpoint image is not the root viewpoint image, the corresponding viewpoint image may be pruned according to another viewpoint image. When the viewpoint image is not the root viewpoint image, information on the number of priority viewpoint images for pruning the viewpoint image and information on an identifier of the priority viewpoint image may be encoded.

The coding information may be included in a frame header, a frame group header, an adaptation parameter set and/or a video header.

According to an embodiment, the pruning order information of the frame header is applicable to a frame corresponding to the frame header. The pruning order information of the frame group header is applicable to all frames of a frame group corresponding to the frame group header. The pruning order information of the adaptation parameter set is applicable to all pictures or slices referring to the adaptation parameter set. In addition, the pruning order information of the video header is applicable to all frames of video.

Alternatively, the encoding information may be encoded as separate metadata. The video encoding method of FIG. 7 may be implemented in the form of a program instruction and stored in one or more memory devices. In addition, the program instruction in which the video encoding method is implemented may be performed by one or more processors. In addition, the bitstream generated according to the video encoding method may be stored and distributed in one or more memory devices. In addition, the bitstream generated according to the video encoding method may be transmitted to another client device through communication, thereby being distributed.

Figure 8:
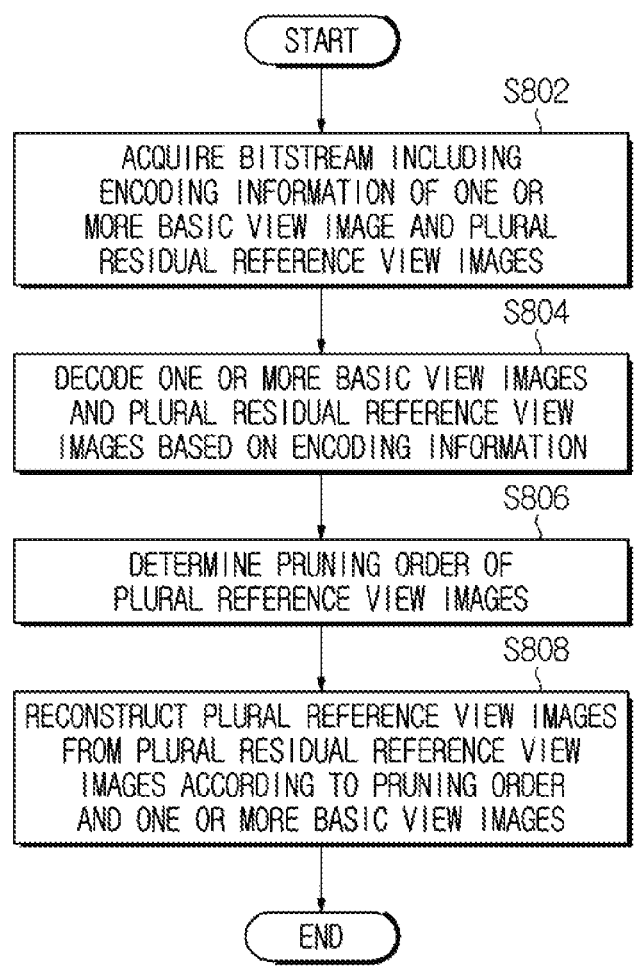
FIG. 8 is a flowchart illustrating an embodiment of a video decoding method for decoding a multi-view image including one or more basic view images and a plurality of reference view images.

FIG. 8 is a flowchart illustrating an embodiment of a video decoding method for decoding a multi-view image including one or more basic view images and a plurality of reference view images.

In step 802, a bitstream including encoding information of one or more basic view images and a plurality of residual reference view images is acquired.

In step 804, one or more basic view images and one or more residual reference view images are decoded based on encoding information.

According to an embodiment, the encoding information may include packing information and source information of the residual reference view. The packing information indicates a method of packing a plurality of distributed valid areas into one valid area in the encoding process. The source information specifies a reference view image from which a packed valid area is derived. According to the packing information and source information, the residual reference view image including the plurality of distributed valid areas may be acquired from the residual reference view image packed into one valid area.

In step 806, the pruning order of one or more reference view images is determined.

According to an embodiment, the pruning order information indicating the pruning order of the plurality of reference view images included in the encoding information may be acquired. In addition, the pruning order of the plurality of reference view images may be determined according to the pruning order information.

The pruning order information may be included in a frame header, a frame group header, an adaptation parameter set and/or a video header. The pruning order of the current frame may be determined by combining the pruning order information of the frame header, the frame group header, the adaptation parameter set and/or the video header. Alternatively, the pruning order information may be signaled as separate metadata.

According to an embodiment, the pruning order of the plurality of reference view images may be determined according to the image indices of the plurality of reference view images.

According to an embodiment, the pruning order of the plurality of reference view images may be determined according to the camera parameters of the plurality of reference view images. The camera parameters may include the position and/or the angle of the camera.

In step 808, the plurality of reference view images is reconstructed from the plurality of residual reference view images, according to the pruning order and one or more basic view images.

With reference to the pruning sequence, the reference view image may be reconstructed using a valid area of the reference view image and a basic view image. In addition, when generating an image at an arbitrary virtual viewpoint with reference view images reconstructed through a series of processes, a higher weight is applied to a valid area of another reference view image preceded by the pruning order than the reference view area in order to generate images from an arbitrary virtual viewpoint. According to an embodiment, a plurality of primary pruning reference view images may be acquired from a plurality of residual reference view images according to the pruning order. Specifically, the primary pruning reference view image of the post-order according to the pruning order may be acquired from the residual reference view image of the post-order according to the pruning order, based on the overlapping area between the residual reference view image of the pre-order according to the pruning order and the residual reference view image of the post-order according to the pruning order. In addition, the plurality of reference view images may be reconstructed according to the plurality of primary pruning reference view images and one or more basic view images.

The video decoding method according to FIG. 8 may be implemented in the form of program instructions and stored in one or more memory devices. In addition, the program instructions in which the video decoding method is implemented may be performed by one or more processors.

The present disclosure provides a method of determining an optimal pruning order of a plurality of reference view images. According to the optimal pruning order, the reference view images are pruned, thereby improving the encoding efficiency of the reference view images.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-RMs or DVD-RCMs; magneto-optimum media such as floptical disks; and hardware devices, such as read-only memory (RCM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A video encoding method of encoding a multi-view image including a plurality of view images, the video encoding method comprising:
   determining a pruning order of each of the plurality of view images, each of the plurality of view images being determined as a basic view image, which is a root node on a pruning hierarchy, or a reference view image, which is not the root node on the pruning hierarchy;
   acquiring a residual reference view image by pruning the reference view image with at least one view image according to the pruning order;
   generating one or more packed images based on the basic view image and the residual reference view image;
   encoding the one or more packed images; and
   outputting a bitstream including encoding information of the one or more packed images and pruning order information of the plurality of view images,
   wherein the pruning order information comprises root node information indicating whether a view image is the root node, and
   wherein when the root node information indicates that the view image is not the root node, the pruning order information further comprises number information specifying a number of parent nodes that have higher pruning priority on the pruning hierarchy than the view image and identity information of each of the parent nodes.

2. The video encoding method according to claim 1, wherein the pruning order of each of the plurality of reference view images is determined based on a number of pixels included in an overlapping area between a reference view image and a basic view image.

3. The video encoding method according to claim 2, wherein whether a pixel included in the reference view image is included in the overlapping area or not is determined by comparing the reference view image with a warped basic view image obtained by warping the basic view image to a view of the reference view image, or by comparing a warped reference view image obtained by warping the reference view image to a view of the basic view image with the basic view image.

4. The video encoding method according to claim 1, wherein the pruning order of each of the plurality of reference view images is determined based on image indices of the plurality of reference view images, and wherein each of the image indices is an acquisition order of the plurality of reference view images.

5. The video encoding method according to claim 1, wherein the pruning order of each of the plurality of reference view images is determined based on camera parameters of the plurality of reference view images, and wherein the camera parameters comprise at least one of a position or an angle of a camera.

6. The video encoding method according to claim 1, wherein the pruning order of each of the plurality of reference view images is determined by:
   acquiring, from the plurality of reference view images, a plurality of first residual reference view images, each of which an overlapping area with the basic view image is removed;
   warping the plurality of first residual view images to a view of the basic view image; and
   determining the pruning order of each of the plurality of reference view images according to the number of pixels of each of the plurality of warped first residual reference view images.

7. The video encoding method according to claim 1, wherein acquiring the residual reference view image comprises:
   generating a residual view image by removing an overlapping area between the reference view image and the basic view image from the reference view image; and
   generating the residual reference view image by removing an overlapping area between the residual view image and an additional residual reference view image from the residual view image, the additional residual reference view image being generated by removing an overlapping area between an additional reference view image and the basic view image from the additional reference view image,
   wherein the additional reference view image has a higher pruning priority on the pruning hierarchy than the reference view image.

8. The video encoding method according to claim 1, wherein the one or more packed images is generated by packing a plurality of distributed valid areas included in the residual reference view image, and wherein packing information for a distributed valid area is further encoded into the bitstream.

9. A video decoding method of decoding a multi-view image, the video decoding method comprising:
   acquiring a bitstream including encoding information of one or more packed images and pruning order information;
   decoding the one or more packed images based on the encoding information; and
   reconstructing a viewport image based on the one or more packed images, wherein the pruning order information comprises root node information indicating whether a view image is the root node, and wherein when the root node information indicates that the view image is not the root node, the pruning order information further comprises number information specifying a number of parent nodes that have higher pruning priority on a pruning hierarchy than the view image and identity information of each of the parent nodes.

10. The video decoding method according to claim 9,
wherein the bitstream further comprises camera parameters comprising at least one of a position and/or an angle of a camera.

11. The video decoding method according to claim 9,
wherein the bitstream further comprises packing information of a valid area included in the one or more packed images, and wherein the packing information indicates whether the valid area is rotated or resized in the one or more packed images.

12. A non-transitory computer-readable recording medium including a bitstream in which a plurality of view images is encoded, the bitstream comprising:

encoding information of one or more packed images; and pruning order information of the plurality of view images, wherein each of the plurality of view images is determined as a basic view image, which is a root node on a pruning hierarchy, or a reference view image, which is not the root node on the pruning hierarchy, wherein the one or more packed images is generated based on a basic view image and a residual reference view image, wherein the residual view image is obtained by pruning the reference view image with at least one view image according to the pruning order, wherein the pruning order information comprises root node information indicating whether a view image is the root node, and wherein when the root node information indicates that the view image is not the root node, the pruning order information further comprises number information specifying a number of parent nodes that have higher pruning priority on the pruning hierarchy than the view image and identity information of each of the parent nodes.

* * * * *